C. H. T. ALSTON.
INTERNAL COMBUSTION ENGINE.
APPLICATION FILED MAR. 6, 1918.

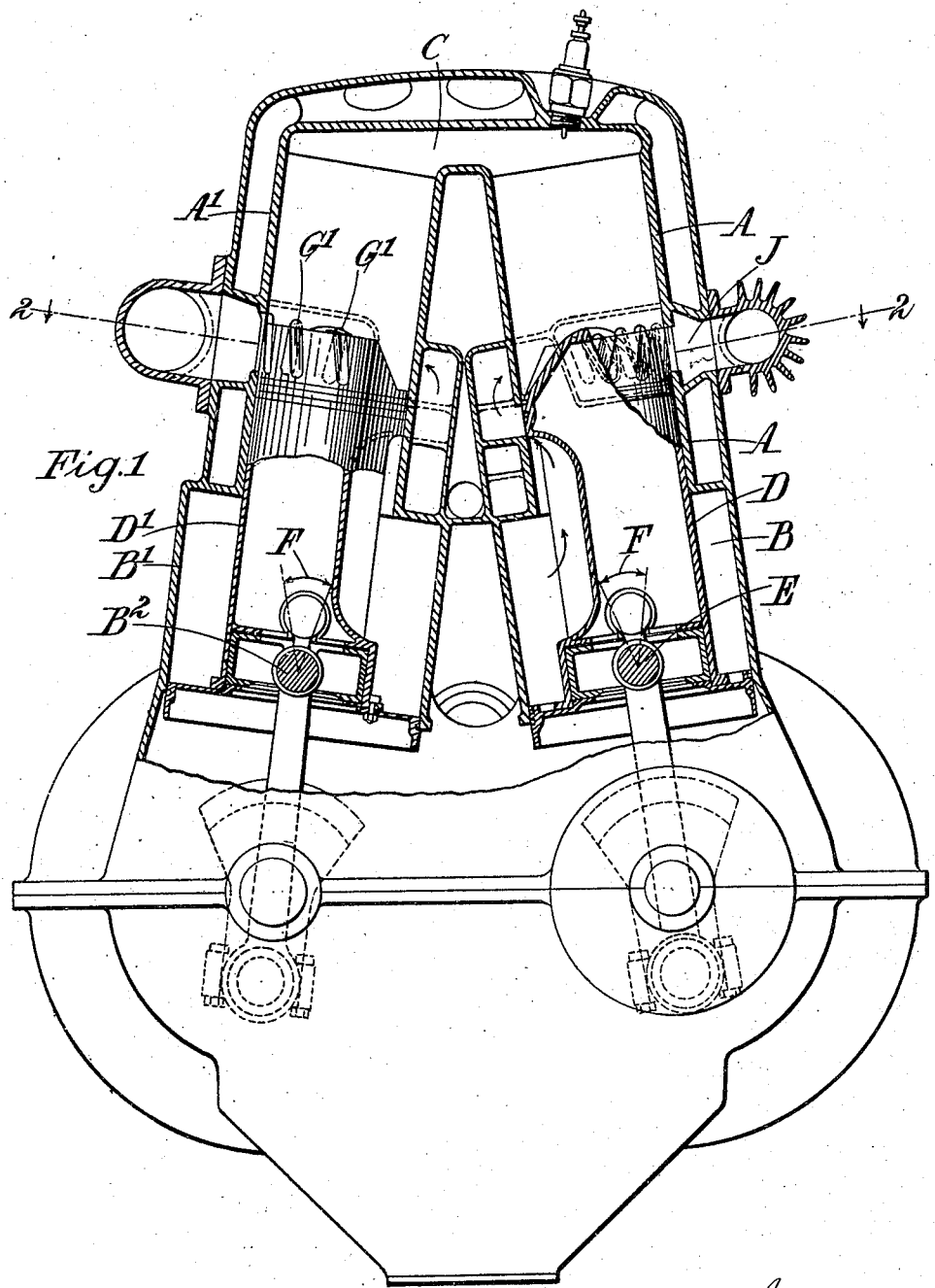

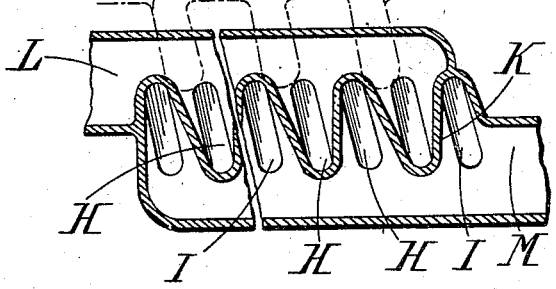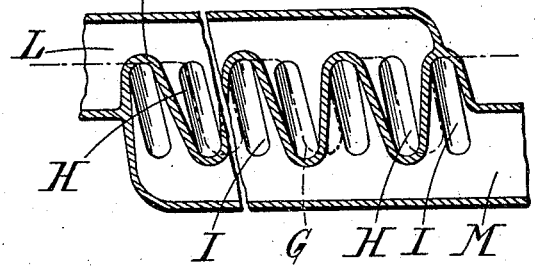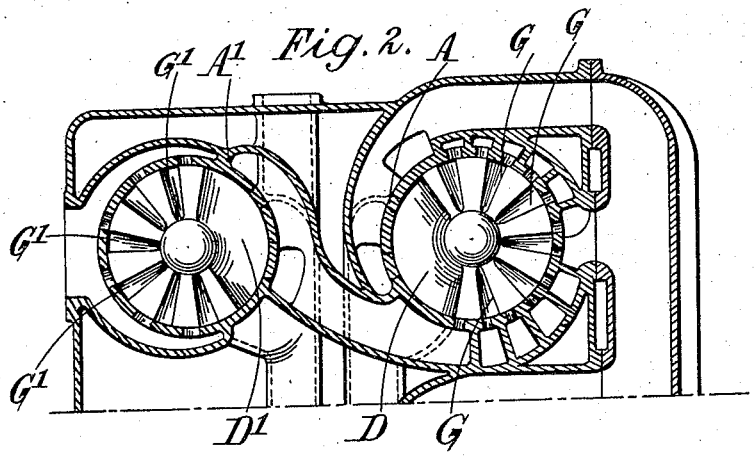

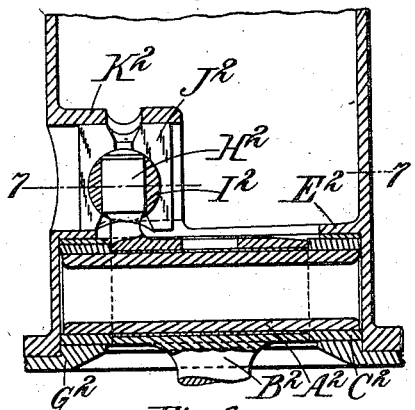
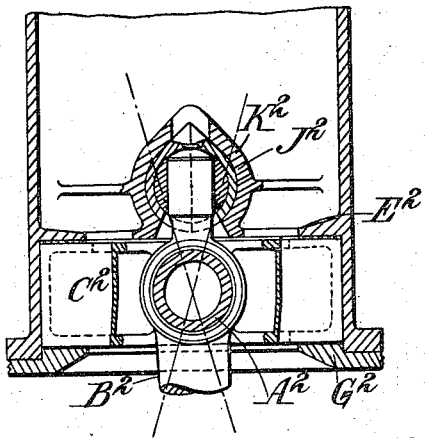
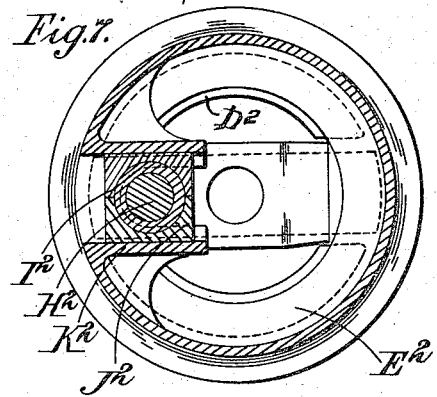

1,342,146.

Patented June 1, 1920.
4 SHEETS—SHEET 4.

Inventor:
Charles Henry Thomas Alston
by Foster Freeman Watson & Coit
Attys

UNITED STATES PATENT OFFICE.

CHARLES HENRY THOMAS ALSTON, OF STIRLING, SCOTLAND, ASSIGNOR TO ALPHAERO ENGINES (FOREIGN PATENTS) LIMITED, OF LONDON, ENGLAND.

INTERNAL-COMBUSTION ENGINE.

1,342,146.     Specification of Letters Patent.     Patented June 1, 1920.

Application filed March 6, 1918. Serial No. 220,865.

*To all whom it may concern:*

Be it known that I, CHARLES HENRY THOMAS ALSTON, a subject of the King of England, residing at Stirling, in Scotland, have invented certain new and useful Improvements in Internal-Combustion Engines, of which the following is a specification.

This invention is for improvements in or relating to internal-combustion engines and has for its object to provide an engine wherein the mean effective pressure of the power stroke shall be higher than that usually attained in the type of engine to which this invention is applicable. The engine operates on the two-stroke cycle and is particularly suited for aircraft but can be applied to other purposes.

The invention relates particularly to improvements in an engine wherein the cylinders are set together in pairs, the elements of each pair being provided with a combustion chamber common to both, and the pistons are arranged to cover and uncover ports in the cylinder walls, one piston controlling the exhaust ports and the other the inlet ports.

The invention is illustrated in the accompanying drawing in which—

Figure 1 is an end elevation of an engine with inclined cylinders which are shown in section;

Fig. 2 is a section on the line 2, 2 in Fig. 1;

Fig. 3 is a diagrammatic development of the inlet cylinder ports shown in section in Fig. 2, and Fig. 4 is similar to Fig. 3 but shows the piston in a different position.

Fig. 5 is a vertical section through part of a piston and passing longitudinally through the gudgeon-pin showing a method of imparting a turning movement to the piston;

Fig. 6 is a vertical section at a right angle to Fig. 5; and

Fig. 7 is a transverse section on the line 7—7 in Fig. 5.

Figure 8:
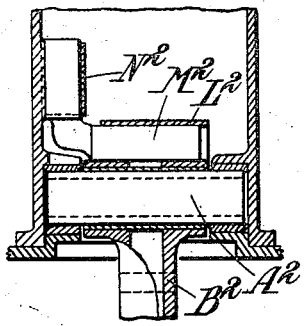
Figure 9:
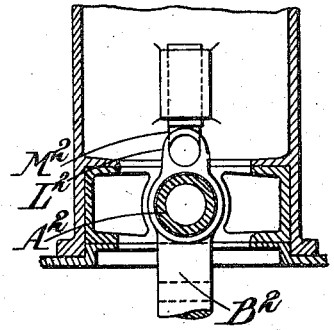
Figure 10:
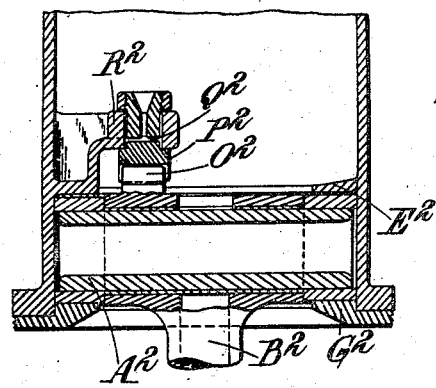
Figure 12:
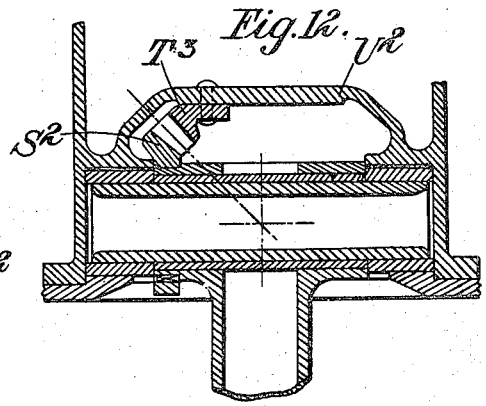
Figure 11:
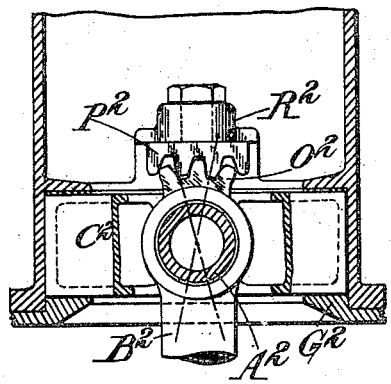
Figure 13:
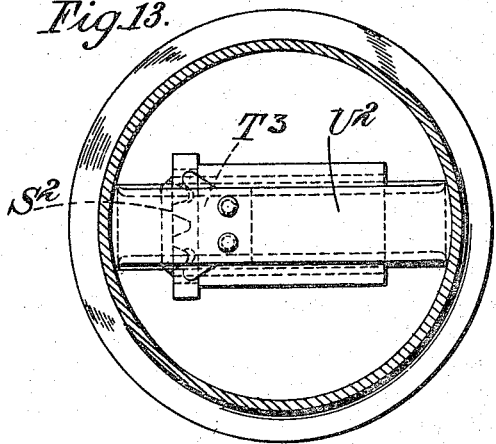

Figs. 8 and 9 are sections similar to Figs. 5 and 6, and show a modified method of imparting the turning movement to the piston, Figs. 10 and 11 are respectively similar sections showing another modification, and Figs. 12 and 13 are respectively a vertical and horizontal section showing another modification.

The cylinders A and $A^1$ are inclined so that the area for radiation of heat in the single combustion chamber connecting them is reduced to a minimum, and this arrangement moreover leaves plenty of room for pump chambers B and $B^1$ which are situated at a point along the cylinders where the cylinders splay apart. The combustion chambers of the two cylinders are connected at C to form one chamber. A turning movement is given to each piston D and $D^1$ by an extension provided on the small end of the connecting rod $B^2$ which oscillates through the arc F while engaging with its piston as hereinafter set forth. The piston D is provided with ports G or their equivalent and ports are provided in the wall of the inlet cylinder A in two sets one H for air only, and the other I for rich mixture (see Figs. 3 and 4), those of the one set being interspaced with those of the other so that the air inlet and mixture ports are alternated around the cylinder.

This arrangement enables the valve setting to be so adjusted by the use of the piston turning mechanism that the exhaust may be made to open say at 60° before the dead-center, the air ports for scavenging purposes may be opened at approximately 45° before the dead-center, the rich mixture ports may begin to open and the air ports and exhaust ports begin to close all at dead-center; the completion of the closing of the air ports may take place at about 20° after dead-center, that of the exhaust ports at about 30° after dead-center, and that of the rich mixture ports at about 65° after dead-center.

In order to carry out this cycle the ports G in the piston of the inlet cylinder A are so arranged that during the first part of the movement of the piston for opening the ports it opens the air inlet series H only, and during the second part of its movement it begins to open the mixture ports I before it closes the air ports H, and finally closes the mixture ports I by piston travel. Referring to Figs. 3 and 4 the top of the piston with ports G is shown in chain lines; and Fig. 3 shows the piston ports about to register with the air ports H, while Fig. 4 shows the piston at a later part of its stroke when the piston ports are about the register with the mixture ports I.

The ports $G^1$ in the piston $D^1$ of the exhaust cylinder $A^1$ only need to be arranged to open the exhaust ports in the cylinder wall, say, during the downward movement of the piston and to close them by the rotary movement of the piston during the early part of the return stroke.

The pump chamber $B^1$ is used for compressing the air charge so that should any escape to the exhaust ports take place past the piston, the waste will be of air only. The pump chamber B is used for compressing the mixture. An admission belt J is provided around the ports in the inlet cylinder, which belt is divided by an undulating horizontal diaphragm K (Figs. 3 and 4) into two chambers, whereof one L communicates with all the air ports H and the other M communicates with all the mixture admission ports I. The charge from the air compression pump chamber $B^1$ is passed to the chamber L by a conduit covered and uncovered by the movement of the piston, and similarly the charge from the mixture pump chamber B is passed to the chamber M by a conduit covered and uncovered by the other piston.

The admission of mixture and air to the pump chambers which is effected by suction, is also controlled by ports covered and uncovered by the pistons.

Obviously additional pairs of cylinders, similarly arranged may be located beneath the crank-shaft, and their pistons connected thereto.

The piston turning mechanism is illustrated in detail in Figs. 5 to 13.

The gudgeon pin $A^2$ for the connecting-rod $B^2$ is carried in bearings $C^2$ formed on a ring $D^2$. The ring $D^2$ is rotatable between a shoulder $E^2$ solid with the piston, and a removable shoulder $G^2$ connected to the piston in any suitable manner. Such a connection between the connecting rod and the piston is common to all the constructions shown for imparting the desired turning movement to the piston.

In Figs. 5, 6 and 7, an extension $H^2$ is provided on the connecting-rod $B^2$ and projects along a line parallel to the connecting-rod but to one side thereof. This extension is cylindrical and fits a correspondingly shaped orifice in a block which comprises a ball $I^2$ rotatably mounted in a split sliding bearing $J^2$. The sliding bearing $J^2$ is carried in a pocket $K^2$ formed on the inner wall of the piston and although slidable therein, it does not rotate.

In Figs. 8 and 9 the extension $L^2$ of the connecting rod $B^2$ has a hole therethrough parallel to the gudgeon-pin, and a pin $M^2$ is slidably and rotatably mounted in said hole. One end of the pin extends to engage rotatably and slidably in a guide $N^2$ formed longitudinally on the inner wall of the piston.

In Figs. 10 and 11 the extension of the connecting-rod $B^2$ has a toothed sector $O^2$ formed on the end, which sector engages a toothed rack $P^2$ carried on a pin $Q^2$ rotatably mounted in a bracket $R^2$ formed on the inner wall of the piston. Lubricating ducts $T^2$ are formed in the pin $Q^2$.

Another method of employing a toothed sector is to give the latter the contour of a bevel wheel $S^2$ (see Figs. 12 and 13) and engage this with the teeth of a coöperating bevel wheel element $T^3$ carried within the piston. The element $T^3$ is supported within the piston on a bridge-piece $U^2$.

It will be appreciated that the particular valve setting described is only by way of example and not by way of limitation, as the mechanism whereby the pistons are moved angularly lends itself to a great variety of valve setting, that described being convenient for some purposes.

What I claim as my invention and desire to secure by Letters Patent is:—

1. In a two stroke cycle internal combustion engine the combination of cylinders set together in pairs, a combustion chamber common to both elements of each pair of cylinders; an admission belt and an exhaust belt around the two cylinders communicating with the working chambers of said cylinders through sets of inlet and exhaust ports in their respective walls; a pump chamber in each cylinder acted upon by the back of the piston, the pump chamber of the cylinder with the exhaust ports compressing air only and the pump chamber of the cylinder with the inlet ports compressing mixture; a gudgeon pin for each piston; bearings for said gudgeon pin; a piston axially rotatable on said bearings but adapted to reciprocate therewith; a connecting rod on said gudgeon pin; an extension on the connecting rod; and connections between the extension and the piston whereby the latter executes a combined turning and reciprocating motion whereby ports in the piston coöperate with the cylinder ports.

2. In a two stroke cycle internal combustion engine the combination of cylinders set together in pairs; a combustion chamber common to both elements of each pair of cylinders; an admission belt and an exhaust belt around the two cylinders communicating with the working chambers of said cylinders through sets of inlet and exhaust ports in their respective walls; a diaphragm in the admission belt dividing same into two chambers, each chamber communicating with the cylinder through its own set of ports; a pump chamber in each cylinder acted upon by the back of the piston, the pump chamber of the cylinder with the exhaust ports compressing air only and the pump chamber of the cylinder with the inlet ports compressing mixture; conduits from the air pump and the mixture pump chambers to the chambers on the two sides of the diaphragm respectively said conduits being covered and uncovered by the pistons; a gudgeon pin for each piston; bearings for said gudgeon pin; a piston axially rotatable on said bearings but adapted to reciprocate therewith; a connecting rod on said gudgeon pin; an extension on the connecting rod; and connections between the extension and the piston whereby the latter executes a combined turning and reciprocating motion whereby ports in the piston coöperate with the cylinder ports.

3. In an internal combustion engine in which the piston uncovers ports in the cylinder by both a turning and a reciprocating movement, the combination of cylinders set together in pairs; a combustion chamber common to both elements of each pair of cylinders; inlet ports in the cylinder wall of one of each pair of cylinders, and exhaust ports in the cylinder wall of the other of each pair of cylinders; a gudgeon-pin for each piston; bearings for said pin; a piston axially rotatable on said bearings but adapted to reciprocate therewith; a connecting rod on said pin; an extension of said rod; and a block which has sliding and turning engagement with the extension, and also has in the transverse direction sliding and turning engagement in a pocket in the piston for effecting the turning movement of the latter.

4. An internal combustion engine comprising the combination claimed in claim 2, and in which the diaphragm is undulatory to separate air and mixture inlet ports arranged alternately to each other circumferentially around the cylinder wall, the inner end of the peripheral surface of the corresponding piston being formed with a series of suitably pitched longitudinal ports the edges of which are parallel to the edges of the cylinder ports, while the piston of the other cylinder is correspondingly ported to coöperate with the single set of cylinder ports leading into the exhaust belt, and in which the various ports of the two cylinders and pistons are so located and dimensioned that the events of the working cycle occur as follows, exhaust opened about 60° before dead center, air ports opened for scavenging about 45° before dead center, mixture ports begin to open and air and exhaust ports begin to close all about dead center, air ports fully closed about 20° after dead center, exhaust ports fully closed about 30° after dead center, and mixture ports fully closed about 65° after dead center, substantially as described.

In testimony whereof I affix my signature.

CHARLES HENRY THOMAS ALSTON.